(12) United States Patent
Kim et al.

(10) Patent No.: US 9,144,014 B2
(45) Date of Patent: *Sep. 22, 2015

(54) METHOD FOR OPERATING PORTABLE TERMINAL TO REDUCE POWER DURING SUPPORT OF COMMUNICATION SERVICE AND PORTABLE TERMINAL SUPPORTING THE SAME

(71) Applicant: Samsung Electronics Co., Ltd., Suwon-si, Gyeonggi-do (KR)

(72) Inventors: Gil Yoon Kim, Suwon-si (KR); Heung Ki Lee, Suwon-si (KR); Tae Hyung Kim, Yongin-si (KR); Hyun Mun Kim, Seongnam-si (KR); Ji Wan Song, Seoul (KR); Yang Soo Lee, Yongin-si (KR); Seung Hwan Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,073

(22) Filed: Jan. 23, 2014

(65) Prior Publication Data

US 2014/0140256 A1 May 22, 2014

Related U.S. Application Data

(63) Continuation of application No. 13/439,208, filed on Apr. 4, 2012, now Pat. No. 8,655,338.

(30) Foreign Application Priority Data

Apr. 5, 2011 (KR) .......................... 10-2011-0031385

(51) Int. Cl.
*H04W 52/02* (2009.01)

(52) U.S. Cl.
CPC ...... *H04W 52/0209* (2013.01); *H04W 52/0225* (2013.01); *Y02B 60/50* (2013.01)

(58) Field of Classification Search
CPC ............... H01J 2237/2441; H01J 2237/24465; H01J 2237/2447; H01J 2237/24592; H01J 37/244; H01J 37/28; H04W 52/0209; H04W 52/0225; Y02B 60/50
USPC ........ 455/414.1–414.4, 418–420, 422.1, 574; 370/311
See application file for complete search history.

(56) References Cited

U.S. PATENT DOCUMENTS

| | | |
|---|---|---|
| 2004/0264396 A1 | 12/2004 | Ginzburg et al. |
| 2005/0021307 A1 | 1/2005 | Schneider et al. |
| 2006/0206453 A1* | 9/2006 | Bande et al. ...................... 707/3 |
| 2011/0007693 A1* | 1/2011 | Frusina et al. ................. 370/329 |

FOREIGN PATENT DOCUMENTS

WO 2007066257 A1 6/2007

* cited by examiner

*Primary Examiner* — Kashif Siddiqui
(74) *Attorney, Agent, or Firm* — Jefferson IP Law, LLP

(57) ABSTRACT

A method for operating a portable terminal so as to reduce power consumption during the support of a communication service and a portable terminal supporting the same is provided. The method includes activating a Radio Frequency (RF) communication unit, downloading a part of data of predetermined contents through the RF communication unit, buffering the downloaded part of the data in a buffer so as to output the buffered downloaded part of the data, and executing an idle time for terminating or reducing a power supply of the RF communication unit when the downloading of the part of the data of the predetermined contents is completed.

21 Claims, 5 Drawing Sheets

METHOD FOR OPERATING PORTABLE TERMINAL TO REDUCE POWER DURING SUPPORT OF COMMUNICATION SERVICE AND PORTABLE TERMINAL SUPPORTING THE SAME

PRIORITY

This application is a continuation of a prior application Ser. No. 13/439,208 filed Apr. 4, 2012, which claimed the benefit under 35 U.S.C. §119(a) of a Korean patent application filed on Apr. 5, 2011 in the Korean Intellectual Property Office and assigned Serial No. 10-2011-0031385, the entire disclosure of which is hereby incorporated by reference.

BACKGROUND OF THE INVENTION

1. Field of the Invention

The present invention relates to a portable terminal. More particularly, the present invention relates to a method for operating a portable terminal so as to reduce power during the support of a communication service and a portable terminal supporting the same, which provides support during a communication service such that a reduction of current power consumption may reduce power consumed according to the operation of a portable terminal by more efficiently operating a power supply while the portable terminal supports a communication service.

2. Description of the Related Art

With the rapid development of communication technology, a portable terminal has various functions including a video phone call function, an electronic organizer function, an interne function, a multimedia function, a data communication function, and the like, as well as a voice phone call function and a short message transmission function. Also, the portable terminal uses hardware and software to support various functions provided by the portable terminal. Namely, a related-art portable terminal provides support for the functions using the hardware and software in order to enable the execution of various application programs by hardware having a high processing capability.

However, a large amount of power is consumed by a portable terminal providing a multimedia player function having complicated functions including the capture of a still image or a moving image, the reproduction of a music file or a moving image file, a game, the reception of a broadcast, or other similar functions. Particularly, the related-art portable terminal consumes more power while supporting a data communication function as well as a phone call function. However, in order for the portable terminal to be mobile or portable, power from a portable and limited power supply, such as a battery, is provided, and thus the portable terminal has a limited use power supply. Therefore, there is a need for more efficiently operating the functions of the portable terminal even in an environment where the portable terminal has a limit on using a power supply.

SUMMARY OF THE INVENTION

Aspects of the present invention are to address at least the above-mentioned problems and/or disadvantages and to provide at least the advantages described below. Accordingly, an aspect of the present invention is to provide a method for operating a portable terminal so as to reduce power during the support of a communication service and a portable terminal supporting the same, which provides support such that power consumption can be effectively reduced by more efficiently operating the portable terminal while the portable terminal supports a communication service.

In accordance with an aspect of the present invention, a method for operating a portable terminal to reduce power consumed during support of a communication service is provided. The method includes activating a Radio Frequency (RF) communication unit, downloading a part of data of predetermined content through the RF communication unit, buffering the downloaded part of the data in a buffer so as to output the buffered downloaded part of the data, and executing an idle time for terminating or reducing a power supply of the RF communication unit when the downloading of the part of the data of the predetermined contents is completed.

In accordance with another aspect of the present invention, a portable terminal for reducing power consumed during support of a communication service is provided. The portable terminal includes a Radio Frequency (RF) communication unit for downloading a part of data of a predetermined size of contents transmitted through a data communication channel, a buffer for buffering the part of the data for a predetermined time, and a controller for controlling the buffering of the part of the data and outputting the buffered part of the data, for terminating or reducing a power supply of the RF communication unit in a power reduction mode such that the RF communication unit has an idle time when the downloading of the part of the data is terminated.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
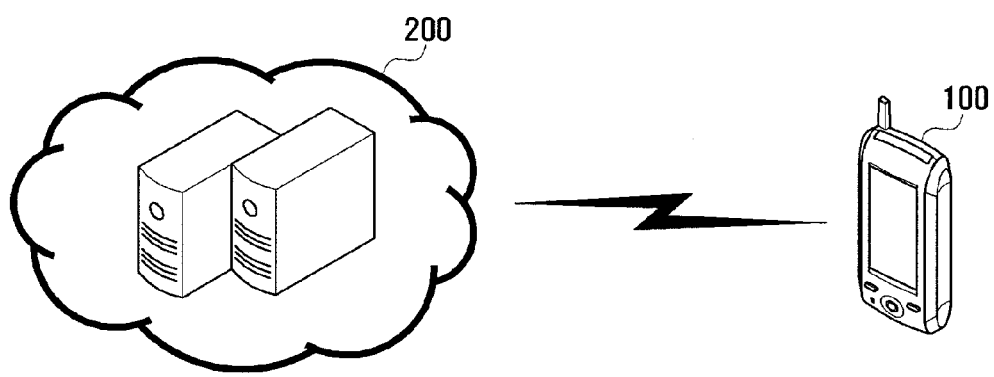
FIG. 1 is a view schematically illustrating a configuration of a system for providing a communication service according to an exemplary embodiment of the present invention.

FIG. 1 is a view schematically illustrating a configuration of a system for providing a communication service according to an exemplary embodiment of the present invention.

Referring to FIG. 1, a system 10 for providing a communication service in a power reduction mode may include a server apparatus 200 for supporting a communication service, and a portable terminal 100 which is connected to the server apparatus 200 and uses a communication service provided by the server apparatus 200.

The system 10 supports the establishment of a communication channel, particularly a data communication channel, between the portable terminal 100 and the server apparatus 200, and provides support such that particular data stored in the server apparatus 200 may be transmitted to portable terminal 100 at a request of the portable terminal 100. To this end, the portable terminal 100 may connect to and communicate with the server apparatus 200 under the control of a user or according to preset schedule information, and may download particular data provided by the server apparatus 200.

Particularly, the portable terminal 100 may receive data using a streaming service or a progressive download service depending on whether the server apparatus 200 provides the data as a streaming service or a progressive download service. However, the present invention is not limited thereto, and any suitable service for transmitting the particular data may be used. The portable terminal 100 receives the data provided by the server apparatus 200 and may display the received data on a display unit 140. In such a case, the portable terminal 100 receives the data using a data communication channel between the portable terminal 100 and the server apparatus 200, and the reception of the data may be adjusted according to a storage capacity of a buffer (not shown) or a storage unit (not shown) for storing received data on the portable terminal 100.

In order to use the data communication channel, the portable terminal 100 may include a communication modem, which may be referred to as a "Radio Frequency (RF) communication unit" herein. Meanwhile, the portable terminal 100 supports a power reduction mode in which a wake-up time period and a dormant time period for the RF communication unit are alternately operated according to an amount of data remaining in a buffer that is to be displayed on the display unit 140. For example, in the portable terminal 100, the RF communication unit is operated when downloading data using a data communication channel, whereas the operation of the RF communication unit is stopped for a predetermined time period for completing the downloading. Accordingly, an amount of power consumed for operating the RF communication unit may be reduced. Also, the portable terminal 100 may reduce power consumption and processing operations due to an unnecessary communication mode change by determining whether the power reduction mode is applied to the RF communication unit or by maintaining a communication mode according to a state of a RF environment. Furthermore, the portable terminal 100 may provide a more stable supply of power during operation of the power reduction mode.

Although in the above description, the portable terminal 100 has been described as receiving data via a communication channel with the server apparatus 200, the present invention is not limited thereto. Namely, the portable terminal 100 may establish a data communication channel between itself and other suitable communication devices, such as another portable terminal or similar communication devices.

Figure 2:
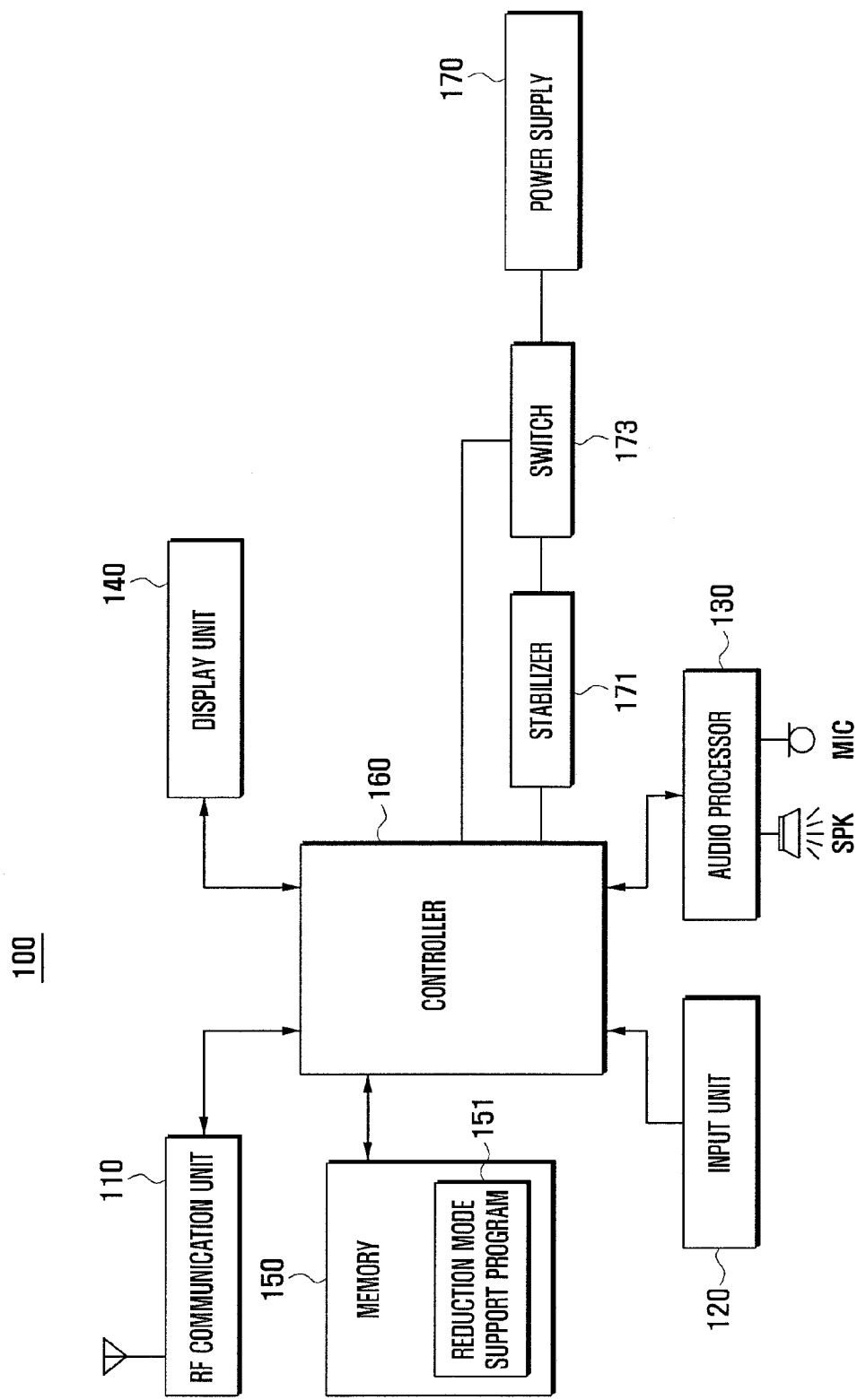
FIG. 2 is a block diagram schematically illustrating a configuration of a portable terminal according to an exemplary embodiment of the present invention.

FIG. 2 is a block diagram schematically illustrating a configuration of a portable terminal according to an exemplary embodiment of the present invention.

Referring to FIG. 2, the portable terminal 100 may include a RF communication unit 110, an input unit 120, an audio processor 130, a display unit 140, a memory 150, a power supply 170, and a controller 160. Also, the portable terminal 100 may additionally include a stabilizer 171 and a switch 173 so that the power supply 170 may stably supply power to elements of the portable terminal 100.

The portable terminal 100 adjusts a wake-up time period and a dormant time period for the RF communication unit 110 according to an amount of data remaining in a buffer that stores data received by the portable terminal 100 during operation of the RF communication unit 110. The portable terminal 100 may reduce power used to operate the RF communication unit 110 according to the adjusting of the wake-up time period and the dormant time period. In the case where a dormant time period is enabled based on the amount of data remaining in the buffer, the portable terminal 100 may output data stored in the buffer to the display unit 140.

Namely, in a case where a data download speed of the portable terminal 100 is faster than a data output speed of the portable terminal 100, the amount of remaining data for a seamless or uninterrupted output of data may be determined in consideration of an output speed of data stored in the buffer. In a case where the data download speed is approximately equal to a data output speed or is less than a predetermined value, a control operation of the portable terminal 100 may be performed so that the power reduction mode is not applied to the portable terminal 100, and a normal power mode, as described below, may be operated.

Also, the portable terminal 100 determines whether the power reduction mode is operated or executed according to a RF environment. When the power reduction mode is executed, the portable terminal 100 may adjust a value, which has been set for the buffer according to the RF environment, in order to adjust the execution of the power reduction mode. Hereinafter, a more detailed description will be made of a function and an operation of each element for supporting the power reduction mode in the portable terminal 100. In the description below, the buffer is included in the controller 160. However, the present invention is not limited thereto, and the buffer may be arranged in the RF communication unit 110 or may be included in the portable terminal 100 in a variety of suitable manners.

The RF communication unit 110 forms communication channels for voice calls, video phone calls, for transmitting data such as images or messages, or for any other similar communication operation under the control of the controller 160. Although not shown, the RF communication unit 110 may include a RF transmitter for up-converting a frequency of a transmitted signal and amplifying the signal and a RF receiver for low-noise-amplifying a received signal and down-converting the signal. Particularly, the RF communication unit 110 may establish a data communication channel between itself and the server apparatus 200, or any other similar communication device, according to the control of the controller 160, so as to receive data corresponding to particular contents, which is provided by the server apparatus 200 in a streaming scheme or in a progressive scheme through the data communication channel according to a user's request or the like, and then may provide the received data to the controller 160.

According to the control of the controller 160, after receiving a part of the total data of the particular contents, the RF communication unit 110 may have a dormant time period for a predetermined time period. Then, according to the control of the controller 160, the RF communication unit 110 may have a wake-up time period after completing the dormant time period. For the wake-up time period, the RF communication unit 110 may continuously receive another part of the total data following the part of the total data that has previously been received, and may deliver the other received part of the total data to the controller 160. After completing the reception of the other data, the RF communication unit 110 may again have a dormant time period according to the control of the controller 160.

The input unit 120 may include a plurality of input keys and function keys for receiving input of numeral or character information and for setting various functions. The function keys may include an arrow key, a side key, and a hot key set to perform certain functions. Furthermore, the input unit 120 generates a key signal associated with user setting and function control of the portable terminal 100. The input unit 120 may be implemented by a variety of key pads, buttons, a touch screen input device, or any other suitable input device. When the display unit 140 of the portable terminal 100 is provided as a full touch type display device, the input unit 120 may include a side key formed at a case side of the portable terminal 100 that operates in conjunction with the full touch type display device.

Particularly, under the control of a user, the input unit 120 of the present invention may generate an input signal for connecting to the server apparatus 200, an input signal provided to the server apparatus 200 in order to select particular content, an input signal for designating a reception of relevant content in a particular communication scheme (e.g. in a streaming scheme), etc. Also, under the control of a user, the input unit 120 may generate an input signal for setting the power reduction mode according to an exemplary embodiment of the present invention. The generated input signals may be provided to the controller 160, and the controller 160 may control the portable terminal 100 so as to support a user function corresponding to the provided input signal.

The audio processor 130 includes a speaker (SPK) for playing audio data or signals transmitted and received during a call, audio data or signals included in a received message, and audio data or signals according to playback of audio files stored in the memory 150 or other similar audio data and signals output by the portable terminal 100 through the speaker (SPK), and a microphone (MIC) for collecting a user's voice or other audio signals during the call or during operation of the portable terminal 100. The audio processor 130 may also output sound effects associated with the generation of an input signal for connecting to the server apparatus 200 and an input signal for reception of data, and supports the output of an audio signal included in the received data. Also, when the power reduction mode is set, the audio processor 130 may output an alarm sound associated with the setting of the power reduction mode at a time point of performing the power reduction mode or during operation of a user function of the power reduction mode. For example, the audio processor 130 may output an alarm sound or a preset guide sound notifying the setting of the power reduction mode, in the process of downloading and outputting the content provided by the server apparatus 200 according to a streaming scheme in a state where the power reduction mode is set. The output of the alarm sound or the guide sound as described above may be omitted according to a user setting or preference.

Meanwhile, when the portable terminal 100 is provided with a touch screen, the display unit 140 may include a display panel (not shown) and a touch panel (not shown) disposed at a front surface of the display panel. The size of the display unit 140 may be determined by the size of the touch panel. The display panel displays information input by a user or information provided to the user as well as various menus of the portable terminal 100. The display panel may be a Liquid Crystal Display (LCD), an Organic Light Emitted Diode (OLED), an Active Matrix OLED (AMOLED) or any other suitable display type. Furthermore, the display panel may be disposed at an upper part or a lower part of the touch panel, or may be disposed at any suitable location of the portable terminal 100.

Particularly, a display panel of the present invention may display data received by the RF communication unit 110. In this case, the data which corresponds to the particular contents provided by the server apparatus 200 may include at least one of an audio signal and a video signal and may be data stored in and retrieved from the buffer. The display panel may include a frame buffer in order to output data, and thus the buffer for storing the data received by the RF communication unit 110 to be displayed on the display unit 140 may be replaced by the frame buffer of the display panel. When a separate buffer for downloading data is included in the controller 160 or the like, the frame buffer of the display panel may temporarily store data stored in and retrieved from the buffer before outputting the data to the display panel. Meanwhile, the display panel may provide a screen for operating the data communication channel in order to operate a touch panel, and at this time, may provide a screen for setting and operating a power reduction mode.

The touch panel may generate a touch event according to a touch object (e.g. a touch of a user's finger or a stylus), and may provide a signal corresponding to the generated touch event to the controller 160. Although not shown, sensors included in the touch panel may be arranged in the form of a matrix, and information on a relevant position of a touch event generated by the touch panel and information on the type of the generated touch event may be provided to the controller 160.

The memory 150 may store a key map or a menu map for an operation of the display unit 140 as well as application programs for various functions and operations. In this case, the key map and the menu map may be implemented in various forms similar to those described above with respect to the input unit 120. Also, the menu map may allow for controlling the operations of application programs executed on the portable terminal 100. The memory 150 may store a power reduction mode support program 151.

The power reduction mode support program 151 includes various routines for supporting the reducing of power consumption during the operation of communication services described above. Namely, the power reduction mode support program 151 may include a routine for managing a buffer, a routine for detecting a RF environment, a routine for managing power, or other similar routines.

The routine for managing a buffer may include a subroutine for identifying a state where data downloaded and delivered by the RF communication unit 110 is stored in a buffer, a subroutine for performing a control operation so as to activate or deactivate the RF communication unit 110 according to an amount of data remaining in a buffer, and a subroutine for adjusting a size of a buffer for supporting a data communication channel according to a RF environment. Also, the routine for managing a buffer may include at least one of a subroutine for determining whether the power reduction mode is being executed, and a subroutine for adjusting a time period for activating or deactivating the RF communication unit 110 according to a RF environment when the power reduction mode is being executed.

The subroutine for the determining of whether the power reduction mode is being executed collects RF environment determination information including at least one of a reception strength of a RF signal, a data transmission speed, and a bandwidth which have been collected by a routine for collecting the RF environment determination information, and performs a control operation for executing the power reduction mode according to the RF environment determination information satisfying preset conditions. In this case, the RF environment determination information may be state information on at least one of the bandwidth of a data communication channel, the data transmission speed, and the reception strength of the RF signal which are formed by the RF communication unit 110, and a type of a communication network used by the RF communication unit 110. Therefore, when the preset conditions are not satisfied, although the power reduction mode is set, the subroutine for determining whether the power reduction mode is applied may cancel the setting of the power reduction mode, i.e., stop executing the power reduction mode, so as to operate the RF communication unit 110 in a normal mode.

For example, when the reception strength of the RF signal is equal to or less than a preset value or when a change in the data transmission speed occurs by an amount equal to or greater than a predetermined value, the change occurring a predetermined number of times during a preset time period, or when a change in the bandwidth occurs by an amount equal to or greater than a predetermined value, the change occurring a predetermined number of times, the subroutine for the determining of whether the power reduction mode is executed may cancel, exit or stop executing the power reduction mode so as to perform control for operating the RF communication unit 110 according to a normal mode having a wake-up time period without having a separate dormant time period.

In this case, for the wake-up time period, the RF communication unit 110 transmits and/or receives data while maintaining a data communication channel between the portable terminal 100 and the server apparatus 200. Also, when the transmission and/or reception of data is deferred so as to be executed at a later time, the wake-up time period may be a time period during which the RF communication unit 110 transmits and/or receives a keep alive packet based on a particular message (e.g. HTTP) in order to maintain the data communication channel between the portable terminal 100 and the server apparatus 200. The wake-up time period may have a state where a predetermined amount of power is supplied to the RF communication unit 110 in order to maintain the data communication channel and transmit and/or receive a message.

Meanwhile, the dormant time period may be a time period for supporting the stopping of an operation related to the transmission and/or reception of data by the RF communication unit 110. Additionally, the dormant time period may be a time period for temporarily cancelling the data communication channel by stopping the operation of the RF communication unit 110. Accordingly, the dormant time period may have a state where a smaller amount of power is supplied to the RF communication unit 110 as compared to an amount of power supplied during the wake-up time period or may have a state where the power supplied to the RF communication unit 110 is cut off.

The routine for the detecting of the RF environment as described above detects a data transmission speed, a bandwidth of a data communication channel, etc. of the data communication channel used by the RF communication unit 110. The detected data transmission speed maybe used when a routine for managing a buffer is activated by being provided to the controller 160. Also, the routine for the detecting of the RF environment may support the detection of channel characteristics, such as the type of a network (i.e. a WiFi channel, a 3G communication channel, a 4G communication channel, or the like) of a communication channel used by the RF communication unit 110.

The routine for the managing of power provides a stable operation of the RF communication unit 110 by switching between paths for supplying power from the power supply 170 according to whether the power reduction mode is being executed. To this end, the routine for the managing of power includes a subroutine for controlling a switch. The subroutine for the controlling of the switch controls a state of the switch 173 so as to deliver power from the power supply 170 to the RF communication unit 110 through the stabilizer 171 when the RF communication unit 110 is operated in the power reduction mode.

The stabilizer 171 stably supplies power while the power supply 170 supplies power to the portable terminal 100. The stabilizer 171 may include elements such as capacitors, diodes, resistors, amplifiers, and other similar electrical circuit elements. The stabilizer 171 may buffer an amount of power corresponding to a power level which is changed by a value more than a predetermined value from among power supplied to the RF communication unit 110, and may reduce a power level change in the form of a pulse which may be generated when power is supplied particularly to the controller 160 or the RF communication unit 110.

More specifically, because the reducing of power among the communication service supports discriminates between a wake-up time period and a dormant time period in operating the RF communication unit 110, when a time period related to the operation of the RF communication unit 110 changes from a dormant time period to a wake-up time period, an amount of power supplied by the power supply 170 may temporarily and suddenly increase. Namely, when an operational state of the RF communication unit 110, which may be in a state where functions, routines and operations are stopped during the dormant time period, is changed to a signal processing state for downloading data from the server apparatus 200 and for delivering the downloaded data to the buffer, a power of the power supply 170 may be changed more suddenly than needed because circuit elements included in the RF communication unit 110 are simultaneously activated.

Accordingly, during operation of the power reduction mode, in order to operate the RF communication unit 110, the stabilizer 171 may be included in the portable terminal 100 so as to suppress a sudden change in power supplied to the controller 160. Thus, during the executing of the power reduction mode, the portable terminal 100 may provide a stable supply of power, and thus an element load due to a change in a power level of each element of the portable terminal 100 is reduced, and thus, a lifespan of each element may be increased.

Furthermore, although the present exemplary embodiment describes the stabilizer 171 as being disposed between the controller 160 and the power supply 170, the present invention is not limited thereto, and the stabilizer 171 may be arranged between the RF communication unit 110 and the power supply 170, or at any other suitable location of the portable terminal 100. Changes to a location of the stabilizer 171 may be made according to a design of a Power Management Integrated Circuit (PMIC) which converts power of the power supply 170 into power for operating the elements of the portable terminal 100 and supplies the converted power to elements of the portable terminal 100. Namely, when a PMIC is included in the controller 160, the stabilizer 171 stabilizes power supplied to the RF communication unit 110 through the controller 160. When the PMIC is included in the power supply 170, the stabilizer 171 may be directly connected to the RF communication unit 110, and may stabilize power supplied to the RF communication unit 110.

According to the location of the stabilizer 171, the switch 173 may be arranged between the power supply 170 and the controller 160 or between the power supply 170 and the RF communication unit 110. The switch 173 switches between paths of power supplied from the power supply 170, as described above. Namely, when the portable terminal 100 supports a communication service in the normal mode as described above, the switch 173 provides a path for directly connecting at least one of the controller 160 and the RF communication unit 110 to the power supply 170 without going through the stabilizer 171.

Also, when the portable terminal 100 supports a communication service in the power reduction mode as described above, the switch 173 may form a path so that power of the power supply 170 goes through the stabilizer 171 and is supplied to at least one of the controller 160 and the RF communication unit 110. Therefore, the portable terminal 100 provides power suitable for a situation by changing characteristics of the supplied power according to whether the power reduction mode is executed. Meanwhile, the switch 173 may not be included in the portable terminal 100, and in such a case, the power supply 170 may supply power through the stabilizer 171 during operation of the power reduction mode or the normal mode.

While controlling the supply of power for operating the elements of the portable terminal 100, the controller 160 may control a signal flow for operating the power reduction mode with respect to each of the elements, wherein the initialization of the elements has been completed.

Figure 3:
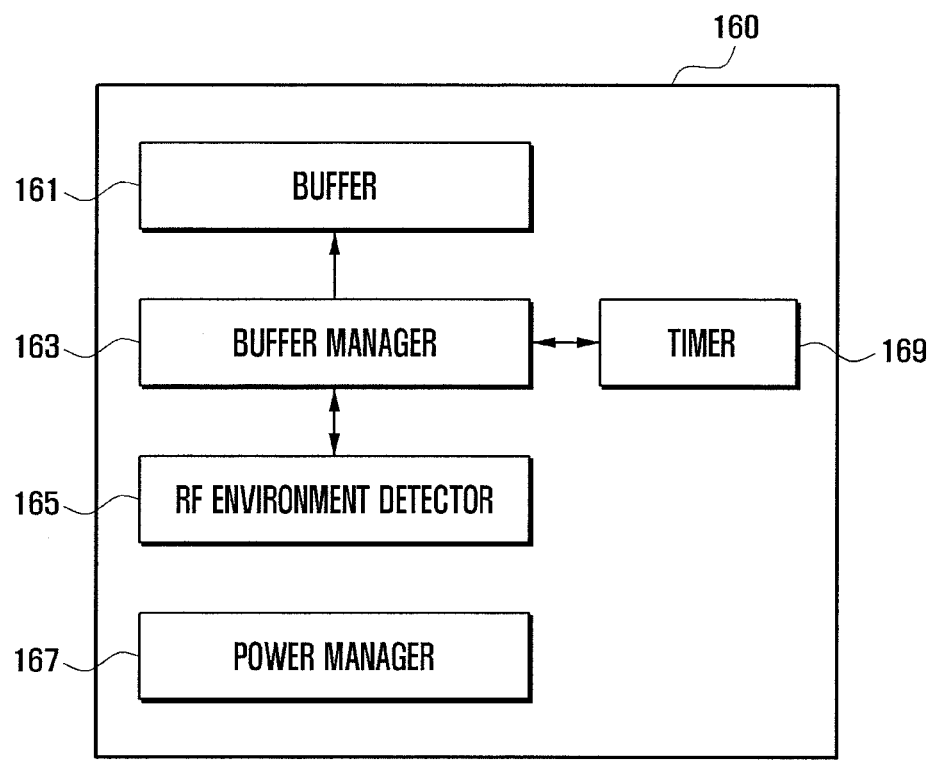
FIG. 3 is a block diagram illustrating a configuration of a controller according to an exemplary embodiment of the present invention.

FIG. 3 is a block diagram illustrating a configuration of a controller according to an exemplary embodiment of the present invention.

Referring to FIG. 3, the controller 160 may include a buffer 161, a buffer manager 163, a RF environment detector 165, and a power manager 167. Also, although not required in all embodiments of the present invention, the controller 160 may further include a timer 169.

The buffer 161 temporarily stores data received by the RF communication unit 110. The buffer 161 may be used to support various user functions of the portable terminal 100, and in this case, a predetermined part of the buffer may be allocated for the support of a particular user function. The buffer 161 may also be an independent hardware element for a particular user function, or may be part of other hardware elements used for storage of data. In the buffer 161, a size or amount of the buffer for buffering data may be adjusted in order to support the power reduction mode. However, the present invention is not limited thereto, and the buffer 161 may have a fixed size in order to support the power reduction mode. Particularly, under the control of the buffer manager 163, the buffer 161 may be allocated a size which may be changed for supporting the functions of the RF communication unit 110 according to a RF environment of the RF communication unit 110. As described above, the buffer 161 may be disposed in the RF communication unit 110, the controller 160, the display unit 140, or in any other suitable location of the portable terminal 100.

The buffer manager 163 may adjust an allocated size of the buffer 161 for downloading particular content, according to at least one of the RF environment and a characteristic of part of the data corresponding to the content which is received by the portable terminal 100. For example, when a change range of a network occurs, the buffer manager 163 may adjust the allocated size of the buffer 161 in order to execute the power reduction mode. Also, the buffer manager 163 may adjust a time point of requesting a downloading of data to be stored in the buffer 161. As such, the buffer manager 163 performs a control operation for receiving the part of the data of the particular content for a predetermined time period and storing the received partial data in the buffer 161.

As the received partial data stored in the buffer 161 is provided to the display unit 140 so as to be displayed, an amount of data stored in the buffer 161 decreases. Accordingly, the buffer manager 163 may adjust a time point (i.e. a time point of requesting the retransmission of data for buffering) for the downloading of different parts of the data of the particular content according to at least one of the amount of data remaining in the buffer 161 and a RF environment. For example, when a bandwidth used by the RF communication unit 110 is decreasing, the buffer manager 163 may increase a reference size of an amount of remaining data for a request for retransmitting data so that an amount of time for a cycle of again filling the buffer 161 is short. Otherwise, when the bandwidth has a value which is equal to or greater than a predetermined value, or when the bandwidth is increasing, the buffer manager 163 may reduce the reference size of the amount of remaining data for a request for retransmitting data so that an amount of time for the cycle of again filling the buffer 161 is long. Accordingly, the buffer manager 163 may manage a time point of receiving data so as to seamlessly perform a streaming service according to a RF environment of a network.

After the buffer manager 163 monitors a time period until the portable terminal 100 enters an actual dormant time period after the portable terminal 100 enters an "Idle" state, the buffer manager 163 may adjust a size of the buffered data while establishing a data communication channel based on relevant information. Namely, as the time period becomes longer, the buffer manager 163 increases an allocated size of the buffer 161 so as to increase an amount of buffered data for the dormant time period. Additionally, when another user function of the portable terminal 100 is activated although the RF communication unit 110 during a dormant time period, the buffer manager 163 may activate the RF communication unit 110 so as to receive data of a predetermined size following data which has previously been received from the server apparatus 200 and is buffered.

Additionally, the buffer manager 163 may suppress entrance into or prevent execution of the power reduction mode according to the RF environment determination information. Also, the buffer manager 163 may operate the timer 169 so as to prevent a change to the power reduction mode and a change to the normal mode. For example, when a change from the power reduction mode to the normal mode, or vice versa, occurs, the buffer manager 163 drives the timer 169. Furthermore, when a change of the power reduction mode or the normal mode occurs a predetermined number of times in a predetermined time period, the buffer manager 163 may perform a control operation for maintaining a particular mode.

Namely, when the RF environment determination information is determined to have a predetermined value, for which a change to the normal mode should occur, when in the power reduction mode, the buffer manager 163 may drive the timer 169 together with the change to the normal mode. Then, if a change to the power reduction mode should occur according to the RF environment determination information, and then, if a change to the RF environment determination information indicating that a change to the normal mode occurs a predetermined number of times or more before the operation of the timer 169 is completed, i.e., before the timer 169 expires, the buffer manager 163 may maintain the normal mode for a predetermined time period in order to subsequently maintain the power reduction mode for a predetermined time period after the change to the power reduction mode. Also, the buffer manager 163 may provide the above described operations and functions for driving the timer 169 after a change from the normal mode to the power reduction mode.

Also, in order to support the power reduction mode according to an exemplary embodiment of the present invention, the buffer manager 163 may adjust an allocated size of the buffer 161 allocated for receiving data, a reference size of the amount of remaining data for retransmitting data, or other similar characteristics of the buffer 161, according to the RF environment and data characteristics. More specifically, the buffer manager 163 may collect network characteristic information detected by the RF environment detector 165, and may predict a bandwidth of a data communication channel established by the RF communication unit 110 by using the collected network characteristic information.

Particularly, the buffer manager 163 may predict a RF environment (i.e. a bandwidth of a data communication channel) of data to be subsequently downloaded, based on the network characteristic information detected by the RF environment detector 165, where the network characteristic information may include link speed information (Link Speed), a busy rate (Busy Rate) corresponding to a usable time period of a shared radio frequency link, and a packet error rate (Packet Error Rate). In such a case, the link speed information may be received from a relevant network and identified in a hand-off process of the portable terminal 100, and a busy rate may be identified through identifying a link layer of the network. Also, the packet error rate may be identified for an IP layer of the data communication channel. A prediction of the bandwidth of the data communication channel, which is based on the network characteristic information as described above, is defined by Equation (1) below.

$$\text{Prediction bandwidth} = \text{Link\_Speed} \times (1-\text{Busy\_Rate}) \times (1-\text{Packet\_Error\_Rate}) \qquad \text{[Equation 1]}$$

By calculating a prediction bandwidth of the data communication channel as described above, the buffer manager 163 may predict a speed at which a subsequent part of the data is to be received after having already received a preceding part of the data from among the particular contents. Therefore, the buffer manager 163 may determine an allocated size of the buffer 161 for the subsequent part of the data to be received based on the calculated prediction bandwidth.

Also, the buffer manager 163 may determine a reference size for the amount of remaining data based on the calculated prediction bandwidth. Namely, when a prediction bandwidth is equal to or greater than a preset value, the buffer manager 163 predicts that the partial data to be subsequently received may be more rapidly received, and may determine a reference size of the amount of remaining data, which is used to determine a time point of requesting the retransmission of data, to be small. Therefore, when a relatively small amount of data remains in the buffer 161, the buffer manager 163 performs a control operation so that the RF communication unit 110 has a wake-up time period for the retransmission of data. As a result, the buffer manager 163 keeps a dormant time period to be longer, and may increase a reduction range of current power consumption for operating the RF communication unit 110.

Also, when a prediction bandwidth is equal to or less than a preset value, the buffer manager 163 may determine a reference size for the amount of remaining data to be large and so as to have a relatively short cycle of requesting the retransmission of data. At this time, when the prediction bandwidth is equal to or less than the particular value, the buffer manager 163 may cancel the setting of a power reduction mode so as to operate the RF communication unit 110 in a normal mode in order to allow for the downloading of the data without having a dormant time period.

According to characteristics of data, the buffer manager 163 may adjust an allocated size of the buffer 161 for receiving the relevant data and a reference size for the amount of remaining data for the retransmission of data. More specifically, although an amount of data has a same size as that of different data in a Variable Bit Rate (VBR)-based data streaming scheme, there may be different transmission cycles (or durations) for outputting a complete image corresponding to the VBR-based data. Namely, when I, P and B-frames, which construct an image, exist, data of a relatively large size may be configured by using an I-frame as compared with a P-frame or a B-frame, and data of a relatively large size may be configured by using a P-frame as compared with a B-frame. Also, the I, P and B-frames as described above may be changed respectively as per the size of data according to characteristics of image elements which construct a scene.

Therefore, in a particular streaming scheme, a cycle range for data which is to be transmitted in order to output a complete image through a display unit may be changed according to characteristics of the data which is to be transmitted. At this time, a transmission order of transmitting the I, P and B-frames as described above may be determined according to predetermined rules. Therefore, the buffer manager 163 may identify characteristics of data to be subsequently received by identifying history information of data stored in the buffer 161. For example, data of a predetermined size which is to be transmitted may be changed according to characteristics of the particular contents. Namely, because news content has a monotonous configuration of a scene and a small amount of motion information, an amount of data required to reproduce the news content for a predetermined time period may be smaller than sports content.

Also, because the sports content has a complicated configuration of a scene and a large amount of motion information, the amount of data for reproducing the sports content for a predetermined time period may be relatively large. Therefore, according to the characteristics of the particular contents, the buffer manager 163 may adjust an allocated size of the buffer 161 for receiving a part of the data of the particular content. Namely, in order to secure a dormant time period which is suitable, the buffer manager 163 may set a smaller allocated size of the buffer 161 for receiving news content than an allocated size of the buffer 161 for receiving sports content, or vice versa. As described above, an allocated size of the buffer 161 may be adjusted according to a RF environment and characteristics of a particular contents. However, the present invention is not limited thereto, and the allocated size of the buffer 161 may be adjusted according to other relevant data transmission and reception characteristics of the portable terminal 100.

Meanwhile, when the allocated size of the buffer 161 is changed according to a change in the RF environment, the buffer manager 163 may identify an allocated size of the buffer 161 so as to execute the power reduction mode when the allocated size of the buffer 161 is equal to or greater than a predetermined size. More specifically, when entry into a dormant time period is determined, the buffer manager 163 may execute the power reduction mode if a time cycle of data buffered in the buffer 161 is larger than at least one of a predetermined time period during which the dormant time period is changed to a wake-up time period, another predetermined time period during which the wake-up time period is changed to the dormant time period, and a preset dormant time period. Namely, the buffer manager 165 may determine the execution of a power reduction mode where a dormant time period is operated when a sum of a time period used for a mode change and a smallest dormant time period used to reduce current power consumption is larger than a total time cycle of the buffered data.

Also, the buffer manager 163 may stop the execution of the power reduction mode so as to operate the RF communication unit 110 in the normal mode when the sum of the time period used for the mode change and the smallest dormant time period used to reduce power current consumption is less than the total time cycle of buffered data. In this case, the time period used for the mode change is independent according to characteristics of a network. Therefore, the buffer manager 163 may monitor a time period during which an "Idle" state is changed to a "dormant" state in a particular network, and may collect values resulting from the monitoring in order to use the collected values for the execution of the power reduction mode as described above. In this case, when a dormant time period of the RF communication unit 110 becomes long, "underflow" may occur. Therefore, the buffer manager 163 may determine a suitable allocated size of the buffer 161 in consideration of a RF environment (i.e. the size of a prediction bandwidth of a network) and characteristics of downloaded content (i.e. a bit rate of an image) and also, may determine a reference size for the amount of remaining data in order to determine a suitable time point of retransmitting data.

The RF environment detector 165 detects a RF environment of the portable terminal 100 in order to manage the buffer 161 via the buffer manager 163. The RF environment detector 165 may detect the size of allocated bandwidth in order to support data communication. The RF environment detector may also detect a speed of transmitting data when in a state of establishing a data communication channel so as to enable the configuration of determination information. Also, the RF environment detector 165 may provide the configured determination information to the buffer manager 163. Furthermore, the RF environment detector 165 may provide the configured determination information to the power manager 167. In this case, the determination information may include the reception strength of a RF signal or the type of a communication network used by the portable terminal 100, or other similar information which may further characterize a RF environment.

The power manager 167 identifies whether the portable terminal 100 is executing a power reduction mode or a normal mode. Also, when the portable terminal 100 is executing the normal mode, the power manager 167 may control the switch 173 so that a path of power supplied from the power supply 170 does not proceed through the stabilizer 171. Furthermore, when the portable terminal 100 is executing the power reduction mode, the power manager 167 may control the switch 173 so that a path of power supplied from the power supply 170 proceeds through the stabilizer 171. Therefore, the power manager 167 controls the switch 193 in order to supply a more stable power to elements of the portable terminal 100 through the stabilizer 171 in the power reduction mode.

As described above, the timer 169 may be configured to prevent a change to the power reduction mode and a change to the normal mode under predetermined conditions in which such a change is undesirable. When a change to a particular mode occurs according to the control of the buffer manager 163, the timer 169 may be activated.

Meanwhile, when data is not buffered in the buffer 161, i.e. when the RF communication unit 110 does not receive a part of the data of the particular contents, the buffer manager 163 may control the RF communication unit 110 so as to complete the existing connection to the server apparatus 200, or other similar electronic communications device, so as to attempt a new connection with the server apparatus 200 or the other similar electronic communications device. When the RF communication unit 110 establishes a data communication channel with the server apparatus 200, a bandwidth or a data transmission speed of the established data communication channel may be reduced according to whether another user uses the established data communication channel, a change in a RF environment, or other similar factors.

Also, data may not be received through a previously connected data communication channel when in a particular state, and, at this time, the buffer manager 163 may identify, by using the timer 169, a predetermined time period during which the buffer 161 may not perform data buffering. When the predetermined time period expires, the buffer manager 163 may cancel or terminate the channel previously used for data communication and establish a new data communication channel. As a result, the buffer manager 163 may provide a good reproduction of content by managing a change in a data communication channel in order to suitably receive data.

Also, the buffer manager 163 may be used to provide a better data communication channel in which a dormant time period may be secured, such that a power reduction mode may be executed. In this case, when certain data is not received within a predetermined time period from a time point of making a request for retransmitting the certain data to the server apparatus 200, the buffer manager 163 may establish a new data communication channel without identifying the data buffered in the buffer 161. When the new data communication channel is established, the buffer manager 163 configures information used to receive different parts of the data following the part of the data previously received from among the particular contents, and may transmit the configured information to the server apparatus 200. Then, the server apparatus 200 may enable the transmission of data following the previously received part of the data.

Figure 4:
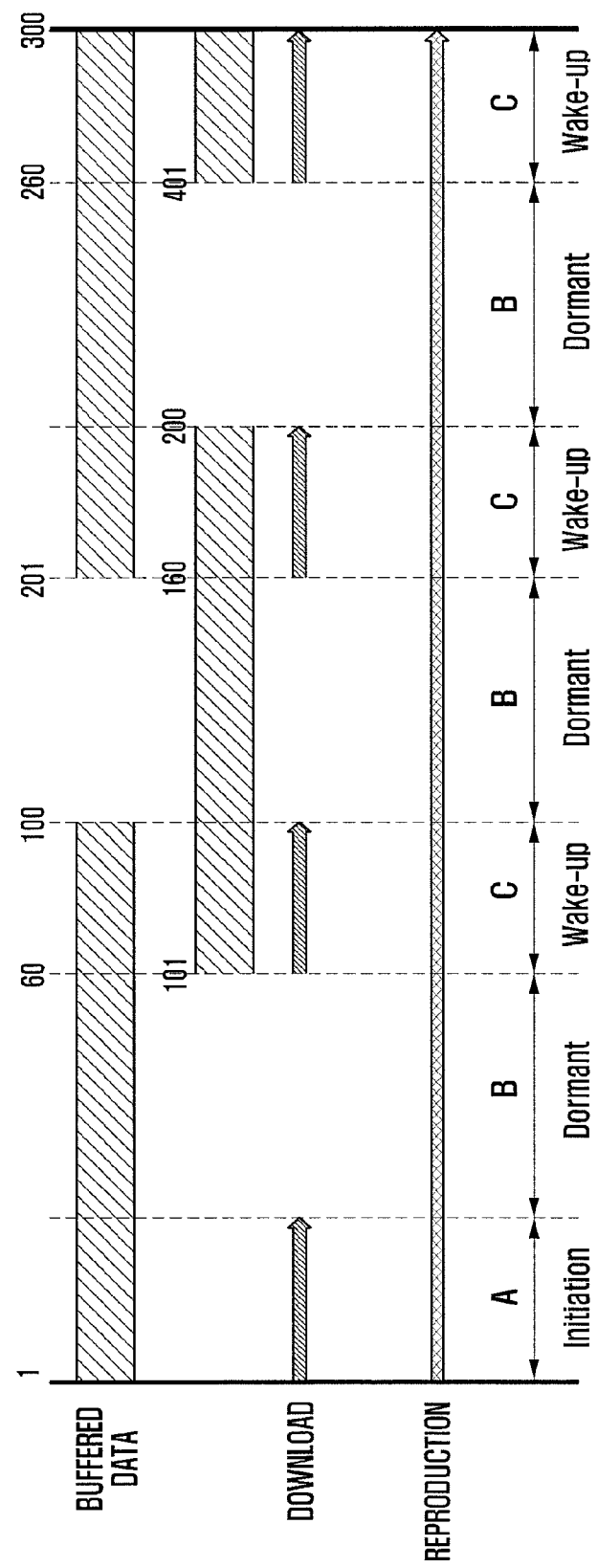
FIG. 4 illustrates the operation of a buffer of a portable terminal in an execution of a power reduction mode according to an exemplary embodiment of the present invention.

FIG. 4 illustrates operation of a buffer according to an execution of a power reduction mode among communication service supports according to an exemplary embodiment of the present invention.

Referring to FIG. 4, after the RF communication unit 110 establishes a data communication channel with the server apparatus 200, when the RF communication unit 110 downloads content provided by the server apparatus 200 according to a streaming scheme under the control of the controller 160, the RF communication unit 110 may download first partial data 1 to 100 from among the contents from the server apparatus 200 during time period A. At this time, after the buffer 161 downloads and buffers the first partial data 1 to 100, and completes the reception of first partial data 1 to 100 in the time period A, the buffer 161 may maintain the first partial data 1 to 100 in the buffer 161 for the time period A as well as for time periods B and C. The portable terminal 100 may provide the data stored in the buffer 161 to at least one of the display unit 140 and the audio processor 130 after a time point when the first partial data 1 to 100 is buffered in the buffer 161, and may reproduce first partial data 1 to 100 via the display unit 140 or the audio processor 130.

In the above described operations, the controller 160 may operate the RF communication unit 110 for downloading content for the time period A as an initiation time period, which is also a wake-up time period. Then, the controller 160 may operate the RF communication unit 110 for time period B as a dormant time period after a time point of completing the downloading of first partial data 1 to 100 in time period A. For this dormant time period, the controller 160 may temporarily cancel a communication channel established between the RF communication unit 110 and the server apparatus 200. For the time period B, power used to operate the RF communication unit 110 is stopped or a smaller amount of power is supplied to the RF communication unit 110 than supplied during the time period A or C.

Next, when buffered data stored in the buffer 161 is exhausted by output processing of the data, i.e. the controller 160 reproduces the data via the display unit 140 or the audio processor 130, and an amount of remaining data is equal to or less than a predetermined amount of data, the controller 160 may activate the RF communication unit 110 for the time period C so as to perform signal processing for downloading second partial data 101 to 200, which follows the first partial data 1 to 100. For example, when the amount of data remaining in the buffer 161 is equal to the amount of remaining data 60 to 100, as shown in time period C in FIG. 4, the controller 160 may activate the RF communication unit 110 in order to download the second partial data 101 to 200 during time period C. At this time, the controller 160 may successively store the second partial data 101 to 200, which is downloaded, in the buffer 161 in which first partial data 1 to 100 is stored and partly exhausted. In this manner, the controller 160 provides support so as to operate a wake-up time period of the RF communication unit 110 according to the amount of remaining data stored in the buffer 161 and so as to make a request for transmitting additional data to server apparatus 200. When the downloading of the additional data is completed, the controller 160 may operate the RF communication unit 110 for a dormant time period.

In the exemplary embodiment of FIG. 4, although the description has been made by designating the amount of data remaining in the buffer 161 as being the remaining data 60 to 100 of the first partial data 1 to 100, remaining data 160 to 200 of the second partial data 101 to 200, and remaining data 260 to 300 of third partial data 201 to 300, the present invention is not limited thereto. Namely, the amount of remaining data serving as a time point of requesting the retransmission of data for buffering may be changed according to a change in a RF environment or other similar factors, as discussed above. Also, an allocated size of the buffer may be adjusted according to a change in the RF environment and the characteristics of the data which is transmitted. In short, an allocated size of a buffer corresponding to time periods A, B, and C, as described above, and a reference size of the amount of the remaining data in the buffer 161 during the time period C may be adjusted according to a change in a RF environment and characteristics of the configuration of an image of data which is transmitted. Also, when the RF environment determination information has a value equal to or less than a predetermined value, the controller 160 may cancel the execution of the power reduction mode and may operate the RF communication unit 110 in a normal mode having a wake-up time period without having a dormant time period.

As described above, during operation of a communication service, the portable terminal 100 may temporarily and repeatedly deactivate the operation of the RF communication unit 110 according to the amount of remaining data stored in the buffer 161. As such, the portable terminal 100 may reduce power consumption for operating the RF communication unit 110. Also, the portable terminal 100 variably adjusts the allocated size of the buffer 161, which may be allocated according to a change in a RF environment so as to secure a more efficient dormant time period of the RF communication unit 110. Namely, the portable terminal 100 may adaptively operate the buffer 161 according to a change in the RF environment and so as to provide a suitable dormant time period for the RF environment.

Hereinabove, the exemplary embodiments have been described with reference to the operations and functions of element of the portable terminal 100 for supporting a power reduction mode, among the communication service supports. Hereinafter, a method for operating the portable terminal for reducing power among the communication service supports will be described in more detail with reference to the accompanying drawings.

Figure 5:
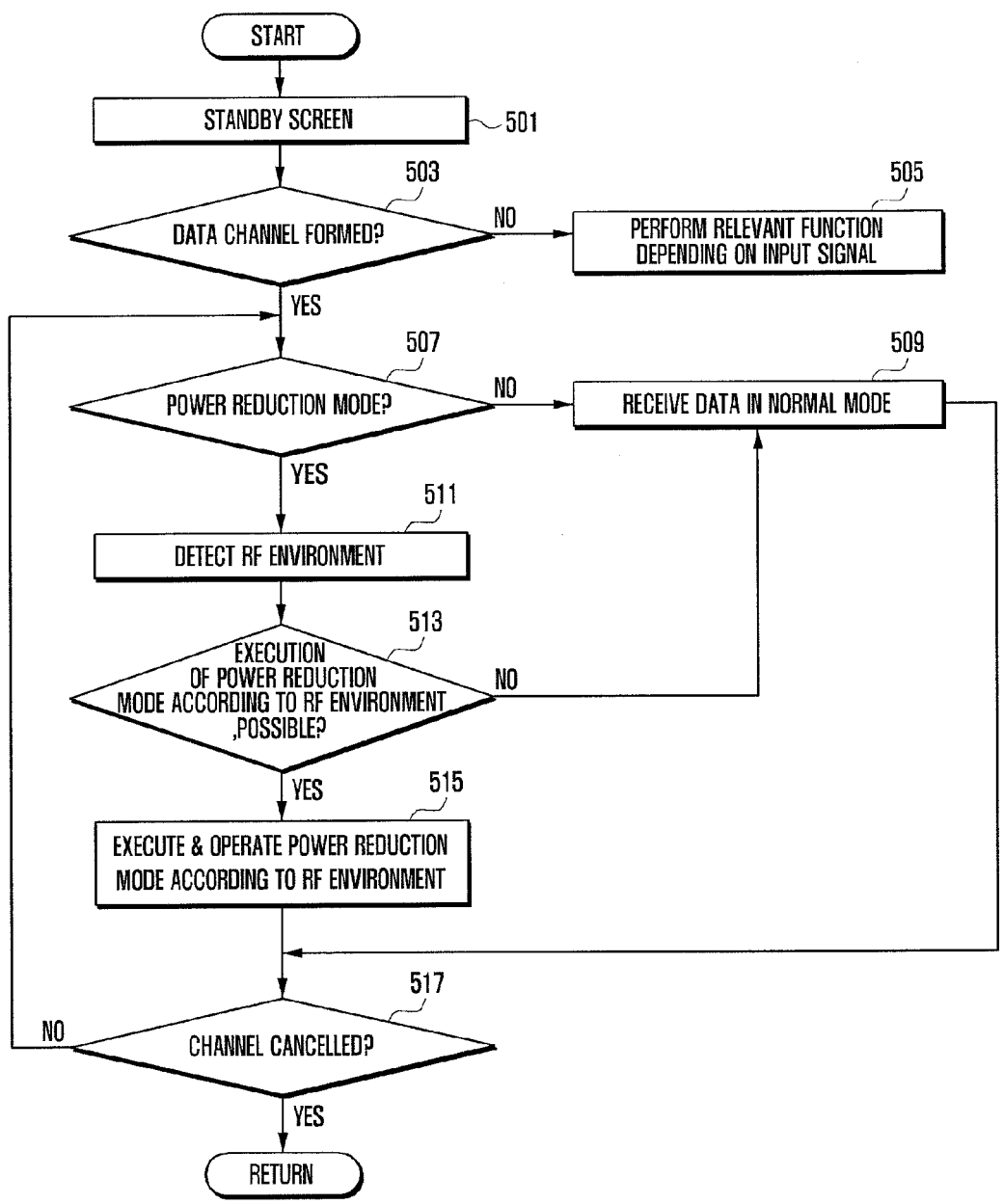
FIG. 5 is a flowchart illustrating a method for operating a portable terminal so as to reduce power during a communication service according to an exemplary embodiment of the present invention.

FIG. 5 is a flowchart illustrating a method for operating a portable terminal so as to reduce power during support of a communication service according to an exemplary embodiment of the present invention.

Referring to FIG. 5, when power is supplied from the power supply 170, the controller 160 may initialize each element of the portable terminal 100 by using the supplied power so as to display a standby screen on the display unit 140 according to preset schedule information in step 501.

Next, in step 503, when an input signal is generated from the input unit 120 or the display unit 140 employing a touch screen, the controller 160 may identify whether the generated input signal is an input signal for establishing a data communication channel. When the generated input signal is not an input signal for establishing a data communication channel, the controller 160 may perform a function corresponding to the generated input signal (e.g. a phone call function, a file search function, a web access function, an image collection function, a broadcast reception function, or other similar functions) in step 505.

In a case where the generated input signal is an input signal for establishing a data communication channel, then in step 507, the controller 160 determines whether a power reduction mode is set. Namely, the controller 160 identifies whether a setting or an input signal for executing the power reduction mode is activated with respect to operating the data communication channel of the portable terminal 100. In order to execute the power reduction mode, a user may generate the input signal for setting the power reduction mode in a configuration menu of the portable terminal 100, or in any other suitable screen displayed on the display unit 140 of the portable terminal 100. Alternatively, when the portable terminal 100 supports the power reduction mode as a default configuration, step 507 may be omitted. When it is determined, at step 507, that the power reduction mode is not set to be executed, the controller 160 may receive data in a normal mode and provide the received data to the display unit 140 or the audio processor 130 in step 509.

When the power reduction mode is determined to be set in step 507, then, in step 511, the controller 160 may determine a RF environment. Namely, the controller 160 identifies or acquires RF environment determination information including at least one of a size of a bandwidth, a speed of transmitting data, a type of a network used for the data communication channel, a reception strength of a RF signal, and other similar information which the RF communication unit 110 acquires when establishing and maintaining the data communication channel. The RF environment determination information may be acquired according to signals, information, and data transmitted and/or received when the data communication channel is established between the server apparatus 200 and the portable terminal 100.

When the acquiring of the RF environment determination information is completed, then in step 513, the controller 160 determines whether a power reduction mode can be executed according to the RF environment determination information. Namely, the controller 160 may determine whether a present state of a RF environment is good enough to enable the operation of the power reduction mode. At this time, the controller 160 may determine whether at least one of elements included in the RF environment determination information is equal to, greater than, or less than a predetermined value in order to determine whether the power reduction mode is executed or not executed, as described above with reference to FIGS. 1-4. When the controller 160 determines that execution of the power reduction is not possible in step 513, then the controller 160 may support the reception of data in a normal mode which is not allocated a dormant time period in step 509.

When the controller determines that execution of the power reduction mode is possible in step 513, then the controller 160 may set and execute the power reduction mode according to the RF environment in step 515). For example, when a size of a bandwidth is equal to or smaller than a set value or when it has a tendency toward decreasing, the controller 160 may adjust a reference size of the amount of remaining data serving as a time point of requesting the retransmission of data for buffering so as to cause the reference size of the amount of remaining data to be small. Also, when the size of a bandwidth has a tendency toward increasing, the controller 160 may adjust the reference size of the amount of remaining data so as to cause the reference size of the amount of remaining data to be small. In this case, when the range of change of the determination information (e.g. the range of change of a bandwidth) is equal to or larger than a preset value, or when the value of a particular element of the determination information is equal to or smaller than a particular value, the controller 160 may adjust the size of the buffer 161 allocated for receiving partial data among contents to be downloaded, so as to cause the size of the buffer 161 to be to be relatively large. As described above, the controller 160 may perform a control operation so as to increase the amount of data stored in the buffer 161 in the process of operating the reduction mode, and so as to secure a suitable dormant time period.

Next, in step 517, the controller 160 identifies generation of an input signal for cancelling the data communication channel with the server apparatus 200. When the input signal for the cancelling of the data communication channel is generated, the controller 160 may proceed to a start of the method illustrated in FIG. 5 so as to repeatedly perform steps illustrated in FIG. 5. Meanwhile, when a result of the identification at step 517 shows that an input signal for cancelling the data communication channel is not generated, the controller 160 proceeds to step 507.

As described above with reference to FIG. 3, the controller 160 operates the timer 169. By using the timer 169, the controller 160 determines a number of times of a change to the power reduction mode and a number of times of a change to a normal mode, with respect to a predetermined time period. When the respective number of times of a change is equal to the preset number, the controller 160 may maintain either of the power reduction mode or the normal mode for a predetermined period of time, which may be determined according to a designer or a setting by a user of the portable terminal 100.

When a variation of a Received Signal Strength Indicator (RSSI) is greater than a preset value during operation of the timer 169, the controller 160 may stop executing the power reduction mode and may perform a data communication service according to the normal mode for the predetermined time. If the predetermined time lapses, the controller 160 determines the RSSI and may execute the power reduction mode according to the determined RSSI. The controller 160 may increase an allocated size of the buffer 161 for receiving a part of the data of the contents when a size of data used for a scene arrangement by the contents is a large amount, and the controller 160 may reduce the allocated size of the buffer 161 when the size of data used for a scene arrangement by the contents is a small amount.

The controller 160 may increase a reference size of a residual data amount when the size of data used for a scene arrangement by the contents is a large amount. The controller 160 may reduce the reference size of the residual data amount when the size of data used for a scene arrangement by the contents is a small amount. Furthermore, the controller 160 collects time period information of data buffered in the buffer 161 and also collects mode change time information when an idle state of the RF communication unit 110 is changed to an idle time. Furthermore, as noted above with respect to FIG. 3, the controller 160 determines the allocated size of the buffer 161 when the RF communication unit 110 is operated in the power reduction mode and when a sum of the mode change time information and predetermined minimum idle time information is greater than the time period information of the buffered data. Additionally, the controller 160 operates the RF communication unit in a normal mode without an idle time when the sum of the mode change time information and predetermined minimum idle time information is less than the time period information of the buffered data.

Furthermore, and as discussed above with respect to FIG. 3, the controller 160 may control the portable terminal 100 to form a power supply path including the stabilizer 171 during execution of the reduction mode, and may form a power supply path including or not including the stabilizer 171 during an operation of a normal mode. Accordingly, the controller 160 may buffer a power supply while the idle time is changed to an activation time so as to provide a stable power supply. Furthermore, the controller 160 selects a data communication channel such that the portable terminal 100 has a suitable idle time for executing the power reduction mode. That is, when a part of the data necessary for playback of contents received through a currently formed data communication channel is not received in a normal manner or the current data communication channel does not have RF environment characteristics capable of supporting the power reduction mode, the controller 160 may release a current data communication channel in order to form a new data communication channel.

To form the new data communication channel having RF environmental characteristics capable of applying the power reduction mode, the controller 160 may form a new data communication channel with the server apparatus 200 or an electronic communication device. To do this, the controller 160 determines RF environmental characteristics of a data communication channel formed through the RF communication unit 110, for example, a bandwidth or a transmission speed, and may form the new data communication channel having RF environmental characteristic values greater than predetermined values. In this case, the predetermined values corresponding to the RF environmental characteristic values of the data communication channel may be value set for executing the power reduction mode.

The controller 160 may repeatedly release and form a data communication channel a predetermined number of times in order to select a suitable data communication channel for executing the power reduction mode. When the formation of the data communication channel for executing the power reduction mode occurs for a number of times greater than the predetermined number of times, the controller 160 determines that the power reduction mode is not executable. After formation of the data communication channel, a normal mode is executed for a predetermined time period based on a corresponding data communication channel in order to play contents received from the server device 200. After the predetermined time period lapses, the controller 160 may again attempt formation of a data communication channel to which the power reduction mode is applicable. In this case, the controller 160 may form a new communication channel when data are not received. Furthermore, in the above case the timer 169 is driven so as to not receive data for a predetermined time such that the procedure for forming a new communication channel may be performed. Through this procedure, the controller 160 may form a data communication channel capable of executing the power reduction mode.

In a method for reducing power of the portable terminal 100 according to an embodiment of the present invention, a RF communication unit 110 may secure a suitable idle time, or in other words, a dormant time period, during support of a data communication service, particularly, a data communication service according to a streaming scheme in order to reduce power consumption. In this case, an operating method of the portable terminal 100 controls a size of a buffer 161 allocated for receiving contents according to a RF environment so as to secure an idle time. Furthermore, the method may determine execution of the power reduction mode according to RF environmental characteristics so as to efficiently operate the RF communication unit 110, and restrain unnecessary signal processing and power consumption due to frequency generation of mode change.

The portable terminal 100 of the exemplary embodiments may further include various additional modules, such as a camera module for photographing still images/moving images of a subject, an interface exchanging data in a wired communication scheme or a wireless communication scheme of the portable terminal 100, an Internet communication module communicating with an Internet to perform an Internet function, and a digital broadcasting module receiving and broadcasting digital broadcasting, or other similar modules included in mobile terminal and portable electronic devices. Furthermore, the portable 100 includes elements and items that may be substituted by specific constructions in the foregoing arrangements according to the provided form or another suitable structure, as can be easily understood to those skilled in the present art.

Furthermore, the portable terminal 100 may include various types of device having a communication module for supporting a data communication service. For example, the portable terminal 100 may include an information communication device and a multimedia device such as a Portable Multimedia Player (PMP), a digital broadcasting player, a Personal Digital Assistant (PDA), a music player (e.g., MP3 player), a portable game terminal, a Smart Phone, a notebook computer, and a handheld PC as well as various mobile communication terminals corresponding to various communication systems.

As described above, according to a method for operating a portable terminal so as to reduce power consumption during the support of communication services and a portable terminal supporting the same, an actual time point of operating the portable terminal is defined in a communication environment so that the supply of power used to operate the portable terminal can be reduced. Also, the operation of the portable terminal suitable for the communication environment is controlled so that the power consumed by the portable terminal may be reduced so as to increase an amount of time during which a consumer uses the portable terminal in a limited power supply environment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
   activating a communication unit;
   downloading at least a part of content via the communication unit during an activation time;
   buffering the part of content in a buffer so as to present the part of content to a user; and
   entering an idle time to terminate or reduce a power supply of the communication unit based on at least one of a characteristic value of data buffered in the buffer and environmental information associated with the communication unit,
   wherein duration of at least one of the activation time and the idle time are adjusted based on at least one of the characteristic value of data buffered in the buffer and the environmental information.

2. The method of claim 1, wherein the characteristic value identifies an amount of data in the buffer.

3. The method of claim 1, wherein the characteristic value comprises at least one of data size, data type, a bit rate of data and a reference size for the data in the buffer.

4. The method of claim 1, wherein the environmental information comprises at least one of state information of a bandwidth of a data communication channel formed by the communication unit, a data transmission speed, a Received Signal Strength Indication (RSSI) of a radio frequency signal, and a type of a network used by the communication unit.

5. The method of claim 1, further comprising:
   entering the activation time when the characteristic value is less than a specified value.

6. A method comprising:
   activating a communication unit;
   downloading at least a part of content via the communication unit during an activation time;
   buffering the part of content in a buffer so as to present the part of content to a user;
   entering an idle time to terminate or reduce a power supply of the communication unit based on at least one of a characteristic value of data buffered in the buffer and environmental information associated with the communication unit, and controlling a size of the buffer based on at least one of the characteristic value and the environmental information, wherein the controlling of the size of the buffer comprises adjusting the size of the buffer based on at least the environmental information.

7. The method of claim 1, further comprising:
requesting an additional part of the content to be downloaded, based on a specified condition.

8. The method of claim 7, further comprising:
controlling the specified condition based on at least one of a characteristic value and the environmental information.

9. The method of claim 8, wherein the controlling of the specified condition comprises:
decreasing a value of the specified condition when a value of the environmental information is greater than a specified value or when the value of the environmental information is increasing.

10. The method of claim 7, wherein the specified condition is a threshold amount of data in the buffer for requesting the additional part of the content.

11. An electronic device comprising:
a communication unit;
a buffer; and
a controller configured to:
   activate the communication unit;
   download at least a part of content via the communication unit during an activation time;
   buffer the part of content in the buffer so as to present the part of content to a user; and
   enter an idle time to terminate or reduce a power supply of the communication unit based on at least one of a characteristic value of data buffered in the buffer and environmental information associated with the communication unit,
   wherein duration of at least one of the activation time and the idle time are adjusted based on at least one of the characteristic value of data buffered in the buffer and the environmental information.

12. The electronic device of claim 11, wherein the controller is further configured to restart or increase the power supply to the communication unit to enter the activation time when the characteristic value of the data buffered in the buffer is less than a specified value.

13. The electronic device of claim 11, further comprising a stabilizer configured to buffer power supply to the communication unit while the communication unit changes from the idle time to the activation time.

14. The electronic device of claim 13, further comprising a switch unit configured to switch a power path to supply power to the communication unit through the stabilizer during the idle time.

15. The electronic device of claim 11, wherein the controller is further configured to enter the activation time when a Received Signal Strength Indicator (RSSI) is less than a specified RSSI value or when variation of the RSSI is greater than a specified variation width.

16. The electronic device of claim 15, wherein the controller is further configured to:
determine a number occurrences of at least one of entering the activation time from the idle time and entering the idle time from the activation time during a specified period; and maintain the idle time or the activation time for another specified period when the number of occurrences is greater than a specified value.

17. An electronic device comprising:
a communication unit;
a buffer; and
a controller configured to:
   activate the communication unit;
   download at least a part of content via the communication unit during an activation time;
   buffer the part of content in the buffer so as to present the part of content to a user;
   enter an idle time to terminate or reduce a power supply of the communication unit based on at least one of a characteristic value of data buffered in the buffer and environmental information associated with the communication unit;
   release a currently formed data communication channel when the communication unit does not receive data; and
   form a new data communication channel.

18. A non-transitory machine-readable storage medium storing instructions that, when executed by at least one processor, cause the at least one processor to perform the method of claim 1.

19. A method comprising:
activating a communication unit;
downloading at least a part of content via the communication unit during an activation time;
buffering the part of content in a buffer so as to present the part of content to a user;
entering an idle time to terminate or reduce a power supply of the communication unit based on at least one of a characteristic value of data buffered in the buffer and environmental information associated with the communication unit,
releasing a currently formed data communication channel when data is not receive, and
forming a new data communication channel.

20. An electronic device comprising:
a communication unit;
a buffer; and
a controller configured to:
   activate the communication unit;
   download at least a part of content via the communication unit during an activation time;
   buffer the part of content in the buffer so as to present the part of content to a user;
   enter an idle time to terminate or reduce a power supply of the communication unit based on at least one of a characteristic value of data buffered in the buffer and environmental information associated with the communication unit, and
   control a size of the buffer based on at least one of the characteristic value and the environmental information,
   wherein the controlling of the size of the buffer comprises adjusting the size of the buffer based on at least the environmental information.

21. A method comprising:
activating a communication unit;
downloading at least a part of content via the communication unit during an activation time;
buffering the part of content in a buffer so as to present the part of content to a user; and entering an idle time to terminate or reduce a power supply of the communication unit based on environmental information associated with the communication unit,
wherein the environmental information comprises at least one of state information of a bandwidth of a data communication channel formed by the communication unit, a data transmission speed, a Received Signal Strength Indication (RSSI) of a radio frequency signal, and a type of a network used by the communication unit.

* * * * *